F. ADAMS.
TIRELESS WHEEL FOR MOTOR TRUCKS, &c.
APPLICATION FILED SEPT. 10, 1915.
1,184,604.
Patented May 23, 1916.
2 SHEETS—SHEET 1.
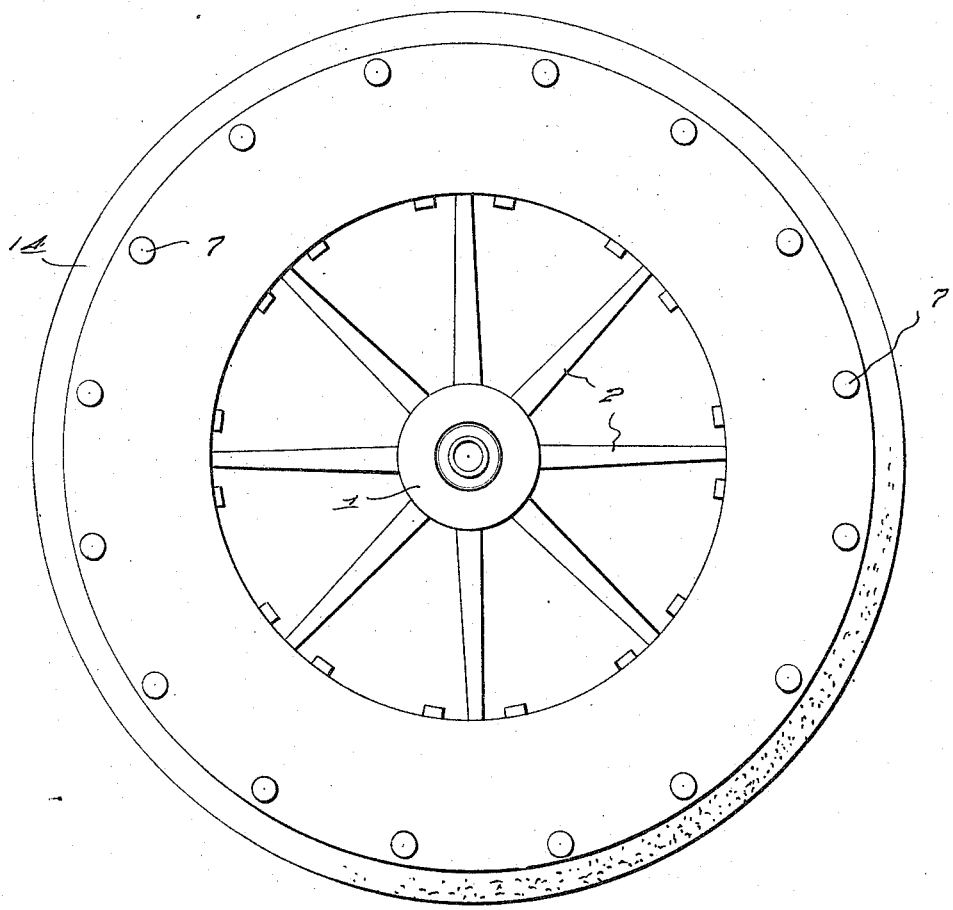
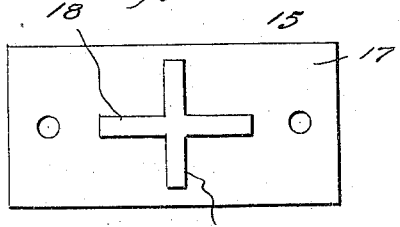
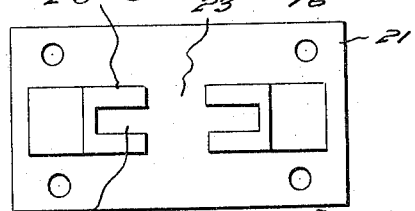

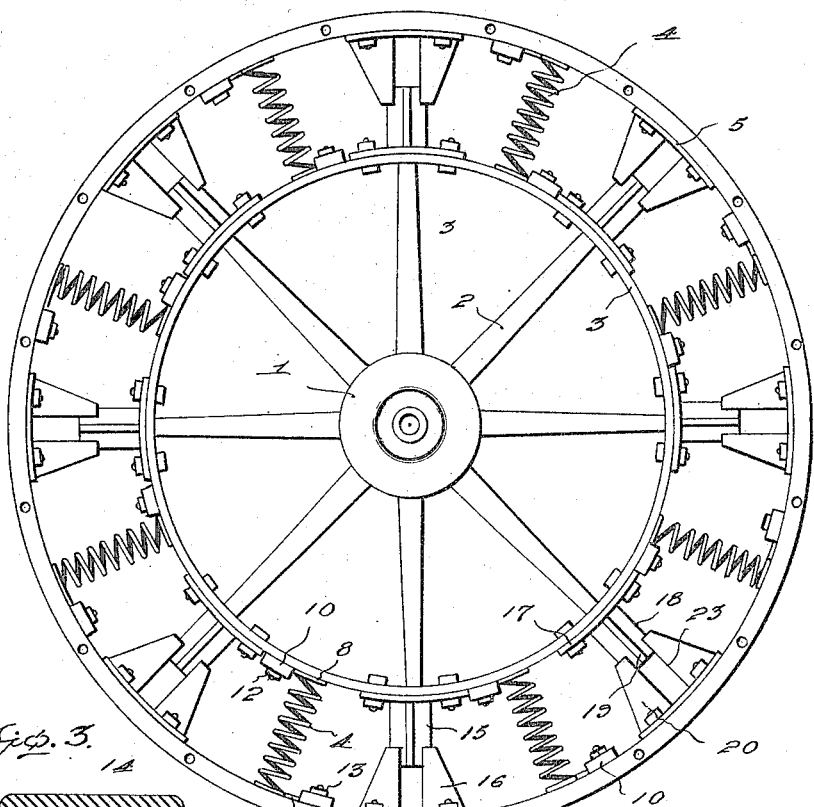
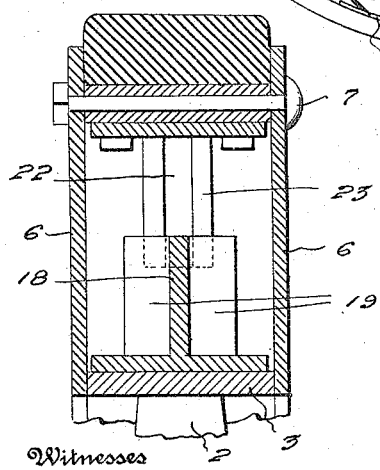

UNITED STATES PATENT OFFICE.

FRANK ADAMS, OF CLARKE STATION, INDIANA.

TIRELESS WHEEL FOR MOTOR-TRUCKS, &c.

1,184,604.          Specification of Letters Patent.         Patented May 23, 1916.

Application filed September 10, 1915. Serial No. 50,078.

*To all whom it may concern:*

Be it known that I, FRANK ADAMS, a citizen of the United States, residing at Clarke Station, in the county of Lake and State of Indiana, have invented certain new and useful Improvements in Tireless Wheels for Motor-Trucks, &c.; and I do hereby declare the following to be a full, clear, and exact description of the invention, such as will enable others skilled in the art to which it appertains to make and use the same.

The invention relates to improvements in resilient wheels.

The object of the present invention is to improve the construction of resilient wheels and to provide a simple, practical and comparatively inexpensive wheel designed for use on automobile trucks and various other vehicles and adapted to dispense with pneumatic tires and capable of affording the necessary resiliency without liability to puncture.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawings Figure 1 is a side elevation of a resilient wheel constructed in accordance with this invention. Fig. 2 is a longitudinal sectional view of the same, Fig. 3 is a transverse sectional view taken substantially on the line 3—3 of Fig. 2, Fig. 4 is a plan view of the male member of the interlocking driving connection, Fig. 5 is a similar view of the female member of the driving connection. Fig. 6 is a detail view of one of the clips.

Like numerals of reference designate corresponding parts in the several figures of the drawings.

In the accompanying drawings in which is illustrated the preferred embodiment of the invention, the resilient wheel comprises in its construction an inner wheel composed of a hub 1, spokes 2 and an inner rim 3 constituting a support for radially arranged coiled springs 4 which are interposed between the inner rim 3 and an outer rim 5. The inner wheel may be of any preferred construction and the inner rim may be constructed of either wood or metal and may be connected to the outer ends of the spokes 2 in any desired manner.

The outer rim which may be made of either wood or metal carries a pair of side plates 6 secured to the outer rim by transverse bolts 7 or other suitable fastening devices. The side plates which are of circular form slidably embrace the inner rim and are relatively movable in the resilient cushioning action of the wheel. The radially arranged coiled springs 4 which may be of any desired number are located between the spokes and are provided with laterally extending inner and outer terminals 8 and 9 which are secured to the inner and outer rims by clips 10 consisting of plates having grooves to receive the terminals of the springs and provided with attaching portions or shanks 11 fastened to the inner and outer rims by bolts or other suitable fastening devices 12 and 13. The spiral cushioning springs may be of any desired strength to suit the character of the vehicle on which the wheel is to be used, and the said springs are adapted to cushion the inner and outer sections or portions of the wheel and obviate the necessity of employing pneumatic tires on motor trucks and other heavy vehicles but the resilient wheel may of course be employed on any vehicle. The outer section of the wheel is preferably provided with a band 14 of resilient sound deadening material preferably consisting of solid rubber or a composition of rubber and fabric arranged on the outer rim and extending beyond the side plates to form the tread surface of the wheel for rendering the same noiseless.

The inner and outer portions of the resilient wheel are connected by coacting male and female interlocking members 15 and 16 forming driving connections and adapted to relieve the spiral cushioning springs of lateral strain without interfering with their cushioning action. The male member is preferably mounted on the inner rim and comprises a base or attaching plate 17 and longitudinal and transversely disposed flanges 18 and 19 preferably formed integral with each other and with the base or attaching plates. The longitudinal and transverse flanges are shown of uniform thickness and the transverse flanges extend from opposite sides of the longitudinal flanges at the center of the male member as clearly shown in Fig. 4 of the drawings. The female member which is mounted on the outer rim comprises parallel longitudinally disposed flanges or arms 20 formed integral with a base or attaching plate 21 and arranged in pairs as clearly shown in Fig. 5 of the drawings. The pairs of arms form longitudinal and transverse slots or openings 22 and 23 to slidably receive the flanges of the male member. The transverse openings are relatively large to permit a limited circumferential relative movement of the inner and outer portions of the wheel so as not to interfere with the cushioning action of the spring. By this construction ample play of the parts is afforded while positively interlocking the inner and outer portions of the wheel.

What is claimed is:

A resilient wheel including spaced inner and outer rims of substantially uniform width arranged one within the other, cushioning means interposed between the rim at intervals and a driving interlocking connection comprising a male member having an attaching flange secured to one of the rims, said male member being provided with longitudinal and transverse flanges formed integral with each and connected together intermediate of the ends of the longitudinal flanges and a female member composed of an attaching flange secured to the other rim and spaced flanges arranged in pairs at the ends of the attaching flange and forming longitudinal and transverse openings, the longitudinal openings snugly receiving the longitudinal flanges of the male member and the transverse openings being relatively large and permitting a limited movement of the transverse flanges of the said male member circumferentially of the wheel.

In testimony whereof I affix my signature in presence of two witnesses.

FRANK ADAMS.

Witnesses:
 FRED C. MORTON,
 WALTER COSTY.